Patented Nov. 14, 1944

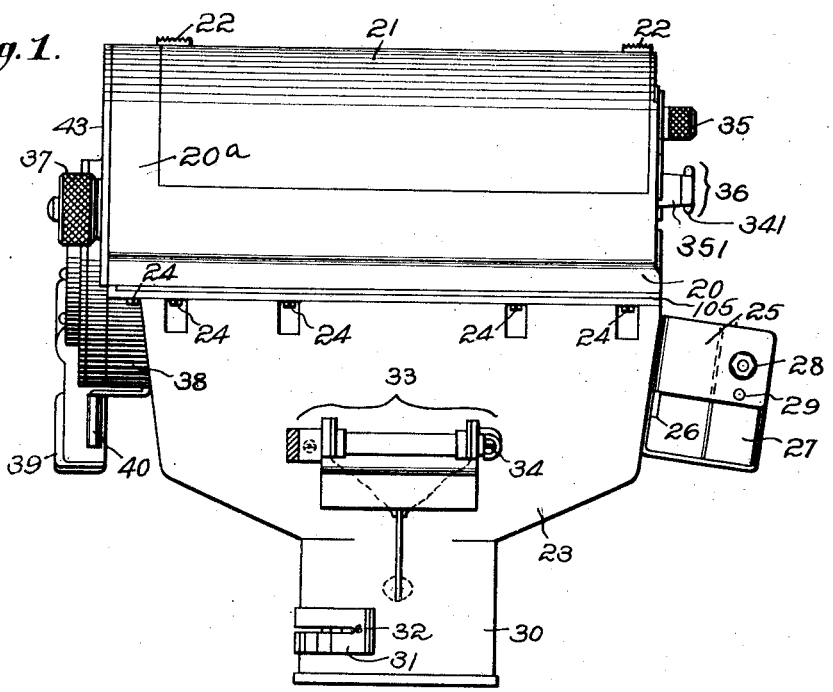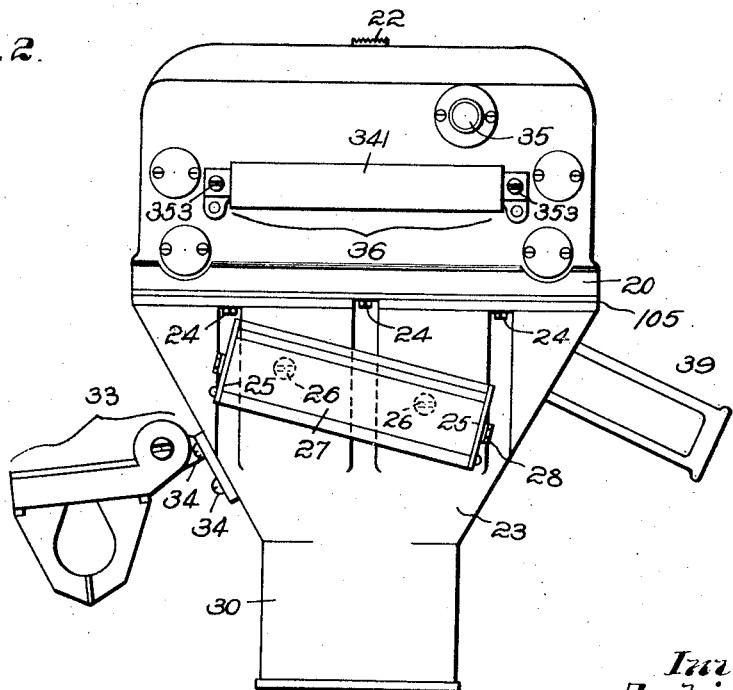

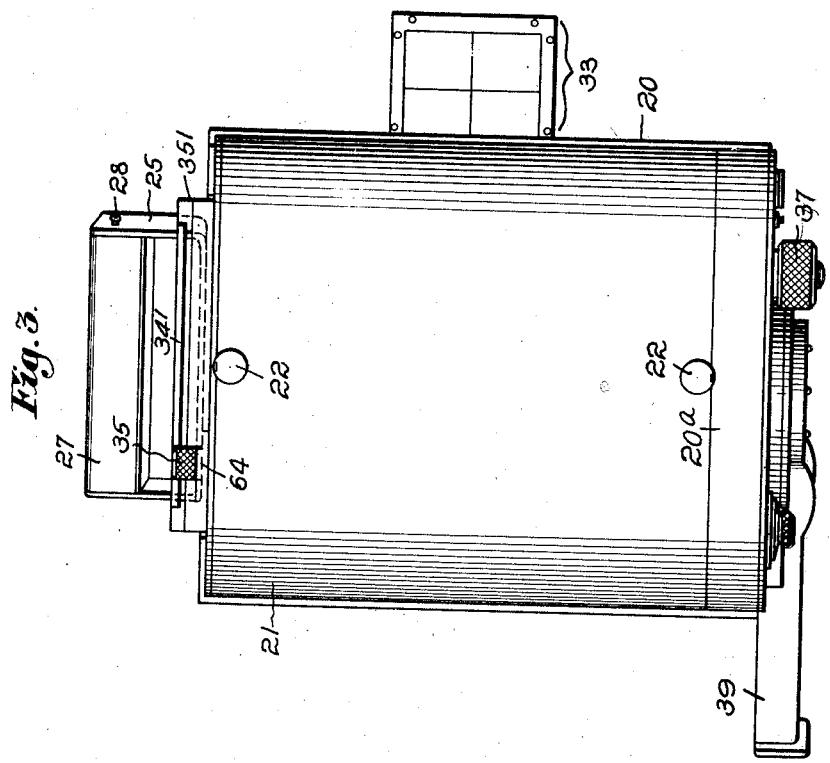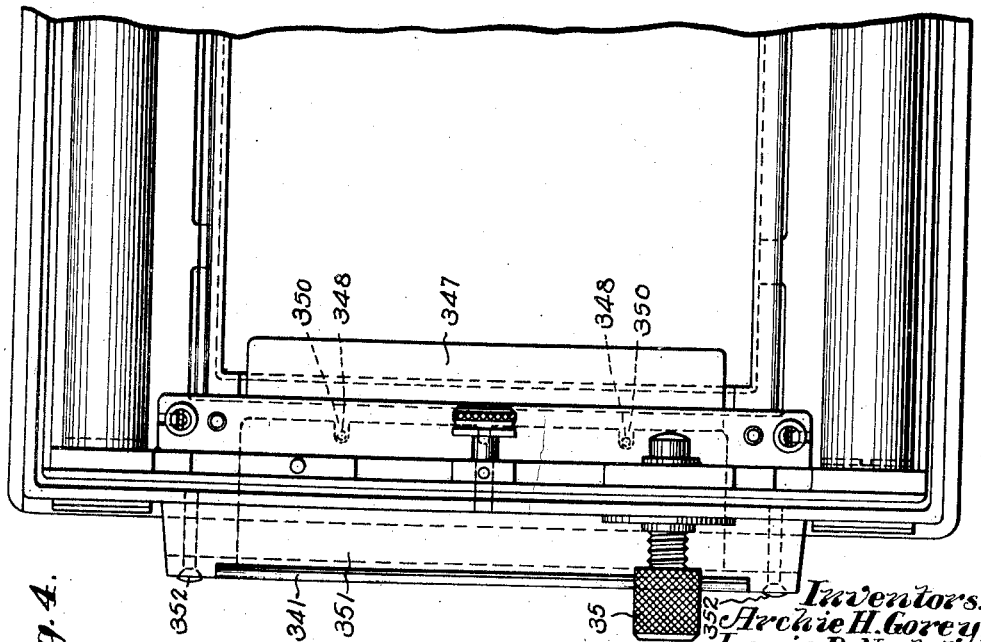

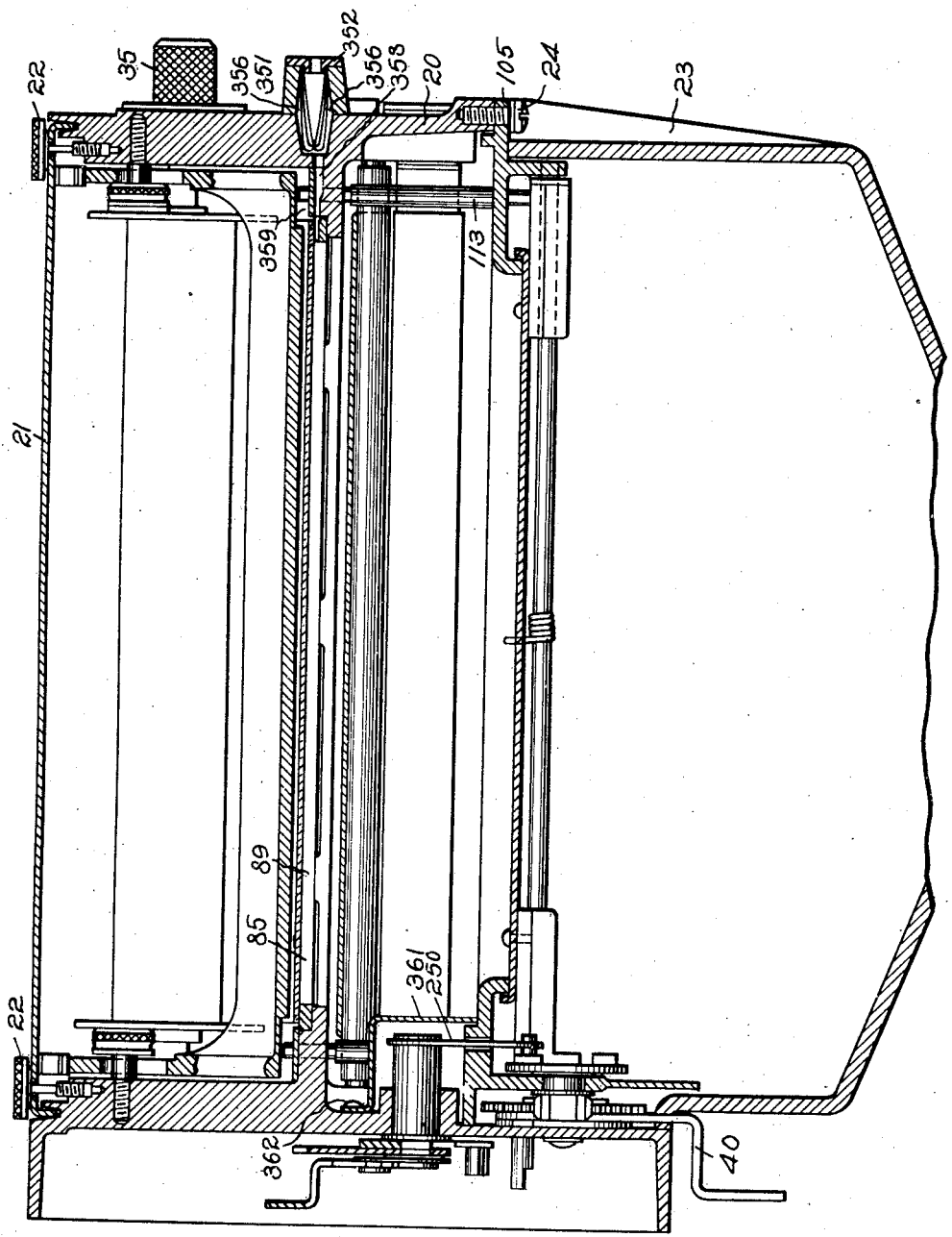

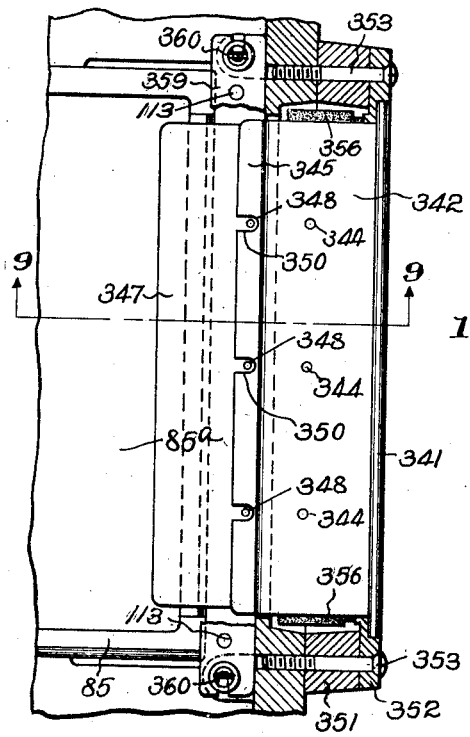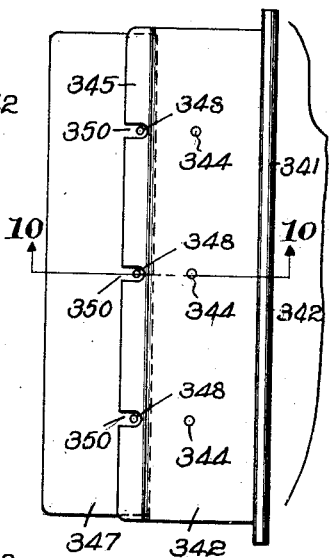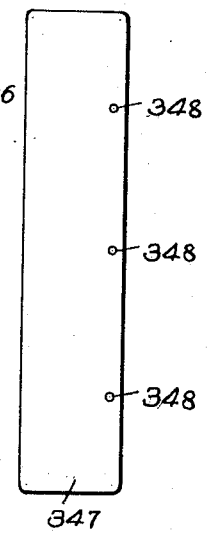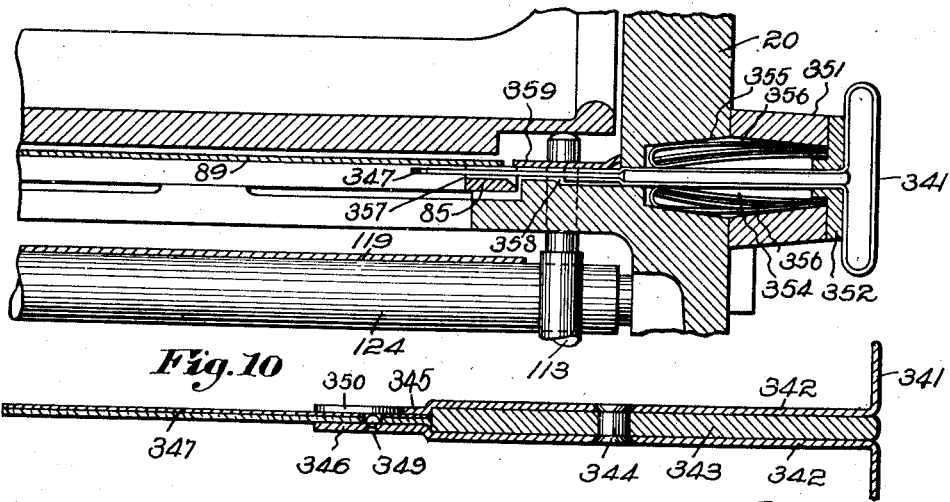

2,362,814

UNITED STATES PATENT OFFICE 2,362,814

PHOTOGRAPHIC EXPOSURE IDENTIFICATION MEANS, PARTICULARLY FOR AERIAL CAMERAS

Archie H. Gorey, Louis D. Nadel, and Edson S. Hineline, Rochester, N. Y., assignors to The Folmer Graflex Corporation, Rochester, N. Y., a corporation of Delaware Original application April 1, 1942, Serial No. 437,240. Divided and this application April 8, 1943, Serial No. 482,236

5 Claims. (Cl. 95—1.1)

This application is a division of our co-pending application Ser. No. 437,240, filed April 1, 1942.

This invention relates to photographic exposure-identification means, particularly for aerial cameras, but not limited to use therewith.

In order that the principle of the invention may be readily understood, we have disclosed a single embodiment thereof in the accompanying drawings, wherein Fig. 1 is a front elevation of the camera showing the position of the stationary handle, and of the operating handle when in position ready for making an exposure;

Fig. 2 is a left side elevation of Fig. 1, showing the position of the identification holder when in place for making an exposure;

Fig. 3 is a top plan view of Fig. 1;

Fig. 4 is a partial top plan view of the camera with the magazine cover and the film pressure pad, film spools and film spool bracket removed to show the exposure aperture, the film recording tab being also shown, the right-hand side of the camera being broken away;

Fig. 5 is a vertical section through the camera, showing the capping gate operating mechanism, and pressure pad mechanism and the position of the several related parts;

Fig. 6 is a partial horizontal section through the camera, taken at the focal plane, to show the position of the exposure recording tab and holder;

Fig. 7 is a top plan view of the exposure recording tab holder with a recording tab in place;

Fig. 8 is a detail in elevation of the recording tab;

Fig. 9 is a section on an enlarged scale, taken through Fig. 6 on the line 9—9 thereof, showing the position of the recording tab when in place prior to making an exposure; and Fig. 10 is a cross section on an enlarged scale of Fig. 7 taken on the line 10—10 thereof, showing the construction of the recording tab holder, a recording tab being in place.

The object of the invention is to provide means to record identification data on the negative at the time of making an exposure.

While the exposure identification means herein claimed may be used in different types of cameras, and while its use is not limited to any particular type thereof, we have in our said application Ser. No. 437,240 shown it as applied to an aerial camera to which it is particularly adapted. We will therefore briefly refer to certain main parts of such a camera, as shown in Figs. 1 to 4.

Referring first to Figs. 1, 2 and 3, therein is disclosed the outside of the camera structure wherein the camera body or housing is indicated at 20 and is provided with a mechanism-housing 20a. The camera body 20 is provided with a film-chamber cover 21 held to the camera body 20 by knurled head screws 22, 22. Attached to said camera body 20 is a lens cone member 23 by means of screws 24, 24, and to one side of the said cone member 23 is attached a stationary handle structure consisting in part of a bracket 25 attached to the said lens cone member 23 by screws 26, 26. Attached to the said handle bracket 25 is a handle 27 held to said bracket 25 by means of a screw bolt 28, and it is kept from turning by means of screw 29. The lens cone member 23 is also provided with the usual lens shade member 30 to which is attached a diaphragm scale 31 by means of screws 32, 32. Also attached to said lens cone member 23 is a direct vision view finder 33 preferably of the usual direct vision type, and it is held to the lens cone member 23 by screws 34, 34.

Protruding from the right-hand side of the camera body 20, viewing Fig. 1, is a take-up spool pivot locking member or cap 35. Also protruding from the said right-hand side of the camera body is a film recording tab holder indicated generally at 36. Protruding from the left-hand side of the camera body 20, viewing Fig. 1, is a shutter speed control knob 37 and a handle boss member 38 to which latter is attached a shutter operating handle 39. Extending from said protruding boss member 38 is a shutter release lever or trigger 40.

It is often desirable to have means for recording data on the photographic negatives as exposures are made, and such recording means should be capable of permitting the operator readily to change data between exposures without fogging any negative. In order to accomplish this, we have provided relatively simple means for photographing or recording information or other data on each negative at the time of exposure, using the light that passes through the lens for making the picture to illuminate the recording medium. The structure of the recording device will best be understood by reference to Figs. 5 to 10.

Reference is first made to Figs. 7 and 8, wherein is shown a top plan view of the stencil holder or film-recording tab holder, indicated generally at 36, and made up as an elongated T-shaped formation of sheet metal, provided with a handle 341 and two horizontally extending members 342, 342, shown in section in Fig. 10. Between said horizontally extending members 342, 342 is a spacer 343, held in place by means of rivets 344, 344, and said members 342 are provided with parallel, lengthwise extending lips 345, 346 shaped or bent around the spacer 343 and which provide a narrow opening for receiving a stencil or tab 347 made of any suitable material such as cellulose acetate and having a translucent surface on which data can be written with an ordinary pencil.

The said stencil or tab 347 is provided with openings 348, shown in Figs. 7 and 8 as engaged by a round head rivet 349 attached to the lip 346 which is provided with notches 350, 350 for the purpose of providing clearance for the rivets 349. The said structure provides ready means for holding the stencil or tab 347 and one which is at the same time easily disengaged therefrom for replacement.

To the camera body is attached, as shown in Figs. 1 to 5 and 9, a light trap member made up of a hollow rectangular structure 351 having a retaining plate 352, said parts being held to the camera wall 20 by screws 353, 353. In the hollow space 354 on the member 351 and a second hollow space 355 of the camera wall are placed two light valves 356, 356 which are desirably substantially the same as the light valves disclosed in the patent to Charles H. Roth, No. 2,056,144.

In Fig. 9, the index card holder is shown in place and therein the stencil or tab 347 is shown as overlapping the aperture plate 85 and as under the sensitized material 89. The said stencil or tab 347 passes through a slot 357 of the aperture plate 85 and a second slot 358 in the aperture plate support member, as most clearly shown in Figs. 5 and 9. Over the said slot 358 is positioned a plate or strip 359 for the purpose of guiding the stencil or tab 347 and holding the aperture plate 85 in position. The said plate 359 is attached to the aperture support member by screws 360, 360 (Fig. 6), and the plate 359 on the opposite side of the camera is similarly attached.

Fig. 6, constituting a horizontal section through a part of the camera casing 20, most clearly indicates the position therein of the stencil holder or film-recording tab holder 36. Therein a glass plate 85a is used in the exposure opening instead of the regular aperture plate 85. The said stencil holder or film-recording tab holder can be placed in position for recording, or can be removed from its position, without admitting light to the sensitized film 89.

In Fig. 5 the stencil holder or film-recording tab holder 36 has been entirely removed from the camera and the opening provided therefor has been closed by light valves 356, 356, thus excluding any light from passing to the sensitized material. In order to prevent light passing from the cone 23 of the camera and through the slot in plate 105 (Figs. 1, 2 and 5) receiving the shutter operating arm or lever 250, there is provided, as best shown in Fig. 5, a light guard 361 held to the camera wall 20 by screw 362.

In Figs. 5 and 9 we have indicated at 105 the capping gate support member or plate, at 113 one of the pressure pad lifting members, at 119 a part of the shutter curtain, and at 124 a curtain idler.

The sensitized sheet is supported in a path immediately adjoining the plane of the slot-like opening in the camera body through which the stencil holder or film-recording tab holder is inserted into functioning position, so that the stencil or tab may come into direct face contact with the surface of the sensitized sheet, and the data upon the stencil or tab may therefore be made to appear very clearly and in an unblurred condition on the sensitized sheet, which would not be the case if the stencil or tab were substantially spaced from the sensitized sheet. When the several pressure pad lifting members 113 are lowered in the operation of the camera, the pressure pad presses the sensitized material into actual face contact with the stencil or tab 347, with the described result of securing a clear unblurred record.

Having thus described one illustrative embodiment of the invention, it is to be understood that although specific terms are employed, they are used in a generic and descriptive sense and not for purposes of limitation, the scope of the invention being set forth in the following claims.

We claim:

1. Means for photographically recording data on the exposure area of a sensitized surface at the time of exposure, including a substantially flat stencil or tab holder insertable through an opening in the wall of the camera casing closely adjacent the path of the sensitized surface, said stencil or tab holder consisting of a sheet metal member bent into general T-shaped form to present a handle and two protruding, flat, parallel members, which latter are insertable through said opening in the wall of the camera casing, and means to secure said two flat members together with space between the forward portions of said two members to receive removably a stencil or tab of translucent material, together with means for bringing the sensitized surface and a face of the stencil or tab into contact, after tab insertion, to provide a clear, unblurred record on said sensitized surface.

2. Means for photographically recording data on an exposure area of a sensitized film at the time of exposure, including a camera the casing whereof is provided at an outer wall with a slot-like through-opening to permit the insertion of a stencil or tab holder, and including in combination such stencil or tab holder of general sheet-like form and having two parallel, slightly spaced members receiving the stencil or tab between them, so as to protrude therefrom into the interior of the camera casing, and on which stencil or tab identifying data may be inscribed, said camera casing having means to support a sensitized sheet in a path immediately adjoining the plane of the slot-like opening in the camera casing, whereby the stencil or tab, while supported by the stencil or tab holder, may come into direct face contact with the surface of the sensitized sheet, so that the data upon the stencil or tab may be very clearly produced on or transferred onto the sensitized sheet in an unblurred condition, together with means to bring the stencil or tab into direct face contact with the surface of the sensitized sheet after the insertion of such stencil or tab into the camera.

3. A photographic structure in accordance with claim 2, but wherein the camera is provided with means for pressing the sensitized sheet directly against a face of said stencil or tab, such means including a pressure pad supported directly over the sensitized sheet and also including means permitting the pressure pad to be lowered onto the sensitized surface in the functioning of the camera.

4. A photographic structure in accordance with claim 2, but wherein the said slot-like opening through a wall of the camera casing is in a transverse plane below but in immediate proximity to the path of the sensitized sheet in the camera.

5. A photographic structure in accordance with claim 2, but wherein the wall of the camera body is provided at said slot-like through-opening with a light-trap and with a light-trap member secured to the outer face of the camera body wall and through which light trap and light-trap member the stencil or tab holder is inserted.

ARCHIE H. GOREY.
LOUIS D. NADEL.
EDSON S. HINELINE.